(12) United States Patent
Nam et al.

(10) Patent No.: US 12,345,378 B2
(45) Date of Patent: Jul. 1, 2025

(54) PRESSURE RELIEF DEVICE FOR HIGH-PRESSURE VESSEL

(71) Applicant: YOUNGDO IND. CO., LTD., Busan (KR)

(72) Inventors: Woo Cheol Nam, Busan (KR); Jin Oh Shin, Busan (KR)

(73) Assignee: YOUNGDO IND. CO., LTD., Busan (KR)

( * ) Notice: Subject to any disclaimer, the term of this patent is extended or adjusted under 35 U.S.C. 154(b) by 0 days.

(21) Appl. No.: 18/293,771

(22) PCT Filed: Jul. 6, 2022

(86) PCT No.: PCT/KR2022/009766
§ 371 (c)(1),
(2) Date: Jan. 30, 2024

(87) PCT Pub. No.: WO2023/027326
PCT Pub. Date: Mar. 2, 2023

(65) Prior Publication Data
US 2024/0255108 A1    Aug. 1, 2024

(30) Foreign Application Priority Data

Aug. 25, 2021 (KR) .................. 10-2021-0112567

(51) Int. Cl.
*F17C 13/04* (2006.01)
*F16K 17/38* (2006.01)
(Continued)

(52) U.S. Cl.
CPC ............ *F17C 13/04* (2013.01); *F16K 17/383* (2013.01); *F17C 13/12* (2013.01); *F17C 13/06* (2013.01);
(Continued)

(58) Field of Classification Search
CPC .......... F17C 13/04; F17C 13/12; F17C 13/06; F17C 2205/0332; F17C 2221/012;
(Continued)

(56) References Cited

U.S. PATENT DOCUMENTS

| 5,632,297 | A  | * | 5/1997  | Sciullo ................. F16K 17/383 137/72 |
| 6,286,536 | B1 | * | 9/2001  | Kamp ..................... F16K 17/38 137/68.13 |
| 8,141,574 | B2 | * | 3/2012  | Weatherly ............. F16K 17/383 137/72 |
| 8,636,165 | B2 | * | 1/2014  | Handa ............... B60K 15/03006 137/79 |
| 9,945,489 | B2 | * | 4/2018  | Daido ................... F16K 17/383 |
| 11,199,274 | B2 | * | 12/2021 | Kunberger ............. F16K 17/40 |
| 11,788,638 | B2 | * | 10/2023 | Ham ..................... F16K 17/383 137/74 |

(Continued)

FOREIGN PATENT DOCUMENTS

JP    2011149545 A    8/2011
JP    2014040875 A    3/2014
(Continued)

OTHER PUBLICATIONS

International Search Report—PCT/KR2022/009766 dated Nov. 28, 2022.

*Primary Examiner* — Minh Q Le
(74) *Attorney, Agent, or Firm* — CANTOR COLBURN LLP

(57) ABSTRACT

A pressure relief device for a high-pressure vessel comprises: a cap member having a space part formed therein; and a piston member having a first chamber part, and dividing the space part of the cap member into a second chamber part and a third chamber part, and thus, when fusible alloy is molten, the molten fusible alloy sequentially flows into the first chamber part and the second chamber part (Continued)

so that leakage of the molten fusible alloy to the outside can be prevented.

7 Claims, 3 Drawing Sheets

(51) Int. Cl.
*F17C 13/12* (2006.01)
*F17C 13/06* (2006.01)
(52) U.S. Cl.
CPC .............. *F17C 2205/0332* (2013.01); *F17C 2221/012* (2013.01); *F17C 2260/042* (2013.01); *F17C 2270/0168* (2013.01); *F17C 2270/0184* (2013.01); *Y02E 60/32* (2013.01); *Y02E 60/50* (2013.01)
(58) Field of Classification Search
CPC ........ F17C 2260/042; F17C 2270/0168; F17C 2270/0184; F16K 17/383; Y02E 60/32; Y02E 60/50

USPC .................................................... 137/79, 72
See application file for complete search history.

(56) References Cited

U.S. PATENT DOCUMENTS

| 2008/0276992 | A1* | 11/2008 | Nomichi | ............. F16K 3/265 137/511 |
| 2016/0010758 | A1* | 1/2016 | Nomichi | ............. F16K 17/383 137/72 |
| 2016/0195193 | A1* | 7/2016 | Daido | ............. F16K 17/383 137/72 |
| 2024/0218982 | A1* | 7/2024 | Kim | ............. F17C 13/04 |

FOREIGN PATENT DOCUMENTS

| JP | 2016056822 A | 4/2016 |
| KR | 100964738 B1 | 6/2010 |
| KR | 101152475 B1 | 6/2012 |
| KR | 20210076757 A | 6/2021 |
| WO | 2010136908 A1 | 12/2010 |

* cited by examiner

PRESSURE RELIEF DEVICE FOR HIGH-PRESSURE VESSEL

TECHNICAL FIELD

The present invention relates to a pressure relief device for a high-pressure vessel, which is mounted in the high-pressure vessel in which high-pressure gas is stored, and is installed in a valve assembly for controlling the flow of gas, to thus discharge gas stored in the high-pressure vessel to the outside when the ambient temperature is increased by a fire or the like, thereby preventing explosion of the high-pressure vessel.

BACKGROUND ART

Currently, in the case of a hydrogen fuel cell system, a valve is provided in a high-pressure vessel containing a gas to control the flow of the gas, when a gas is charged into the high-pressure vessel, and to control the flow of the gas, when the gas stored in the high-pressure vessel is supplied to a gas consumer.

Such a valve may precisely control the flow of a gas according to an electric signal, and should keep the pressure of the gas stored in a hydrogen vessel to be constant, and prevent explosion of a high-pressure vessel when a hydrogen fuel cell vehicle overturns or a fire breaks out therein.

Therefore, when the ambient temperature rises in the event of an outbreak of fire, or the like, the valve is equipped with a pressure relief device (PRD) that discharges, to the outside, the high-pressure gas stored in the high-pressure vessel.

As disclosed in Korean Patent No. 10-0964738 (Jun. 10, 2010), a conventional pressure relief device includes a fusible alloy coupling unit installed in a valve coupling unit coupled to a valve of a gas vessel filled with a gas, wherein a fusible alloy is mounted on the fusible coupling unit to be sealed, a disc is inserted into the valve coupling unit to prevent the fusible alloy from being pushed by high-pressure, and when the surrounding environment temperature rises above a specific temperature and thus, the fusible alloy is molten, to discharge the gas stored in the gas vessel to the outside to thereby prevent explosion of the gas vessel.

However, in such a conventional pressure release device, heavy metal components are released to the outside as the fusible alloy is molten, resulting in environmental pollution, that is, contamination of the operating space or contamination of the workplace.

DISCLOSURE

Technical Problem

Therefore, the purpose of this invention is to provide a pressure release device for high-pressure vessels that may prevent environmental pollution and workplace contamination by preventing molten fusible alloys from being discharged to the outside when an ambient temperature rises above a set temperature.

Technical Solution

According to an aspect of the present invention, there is provided a pressure relief device for a high-pressure vessel, which is mounted on a mounting part formed between an inlet passage through which gas from a valve body flows and a discharge passage through which gas is discharged to the outside to open and close the inlet passage, the pressure relief device including: a cap member mounted on the mounting part to be able to seal and having a space part formed therein; a piston member inserted into the cap member to be linearly movable, having a first chamber part with an open lower side, sealing the inlet passage by being inserted into the inlet passage to be sealed, and dividing the space part of the cap member into a second chamber part and a third chamber part; a spring installed between the piston member and an inner surface of the mounting part to provide an elastic force in a direction in which the piston member is retracted; and a fusible alloy which is mounted on the third chamber part positioned below the piston member so as to support the piston member so that the piston member is not retracted, and is molten to retract the piston member and open the inlet passage when a surrounding temperature is greater than or equal to a set temperature, wherein, when the fusible alloy is molten, the molten fusible alloy is sequentially introduced into the first chamber unit and the second chamber part to be prevented from being discharged to the outside.

The piston member includes: a sealing rod part inserted into the inlet passage to seal the inlet passage; a chamber forming part forming a first chamber part, which has an outer diameter greater than that of the sealing rod part below the sealing rod part and has an open lower side thereof; and a slide part that extends outward from a lower side of the chamber forming part to be in contact with an inner surface of the cap member to slidably move and divide the space part of the cap member into the second chamber part and the third chamber part.

A connection passage part is formed in the chamber forming part to connect the first chamber part and the second chamber part to allow the molten fusible alloy introduced into the first chamber part to flow into the second chamber part.

A porous screen is provided between a bottom surface of the piston member and the fusible alloy, and the porous screen may be introduced into the first chamber part through the porous screen when the fusible alloy is molten.

A plurality of grooves may be formed on an outer surface of the sealing rod part, and a plurality of sealing rings may be mounted in the plurality of grooves.

The cap member has a screw part formed on an outer surface thereof so as to be screw-coupled to an inner surface of the mounting part, a space part having an open upper side formed on an inner surface thereof such that the piston member and the fusible alloy are inserted therein, and a space securing part having a lower side thereof protruding from an outer surface of the valve body by a length (L1) so as to determine the length of the space part.

Advantageous Effects

As described above, the pressure release device for a high-pressure vessel according to the present invention is mounted on a mounting part formed in a valve body to form a first chamber part inside a piston member to open an inlet passage, thereby preventing a fusible alloy, which is a heavy metal component, from being released to the outside, if the fusible alloy is molten, thus preventing environmental pollution.

In addition, a second chamber part is formed inside a cap member mounted on the valve body to allow the fusible alloy introduced into the first chamber part to flow into the second chamber part, ensuring sufficient space for the molten fusible to be stored without being released to the outside.

BEST MODE

Figure 1:
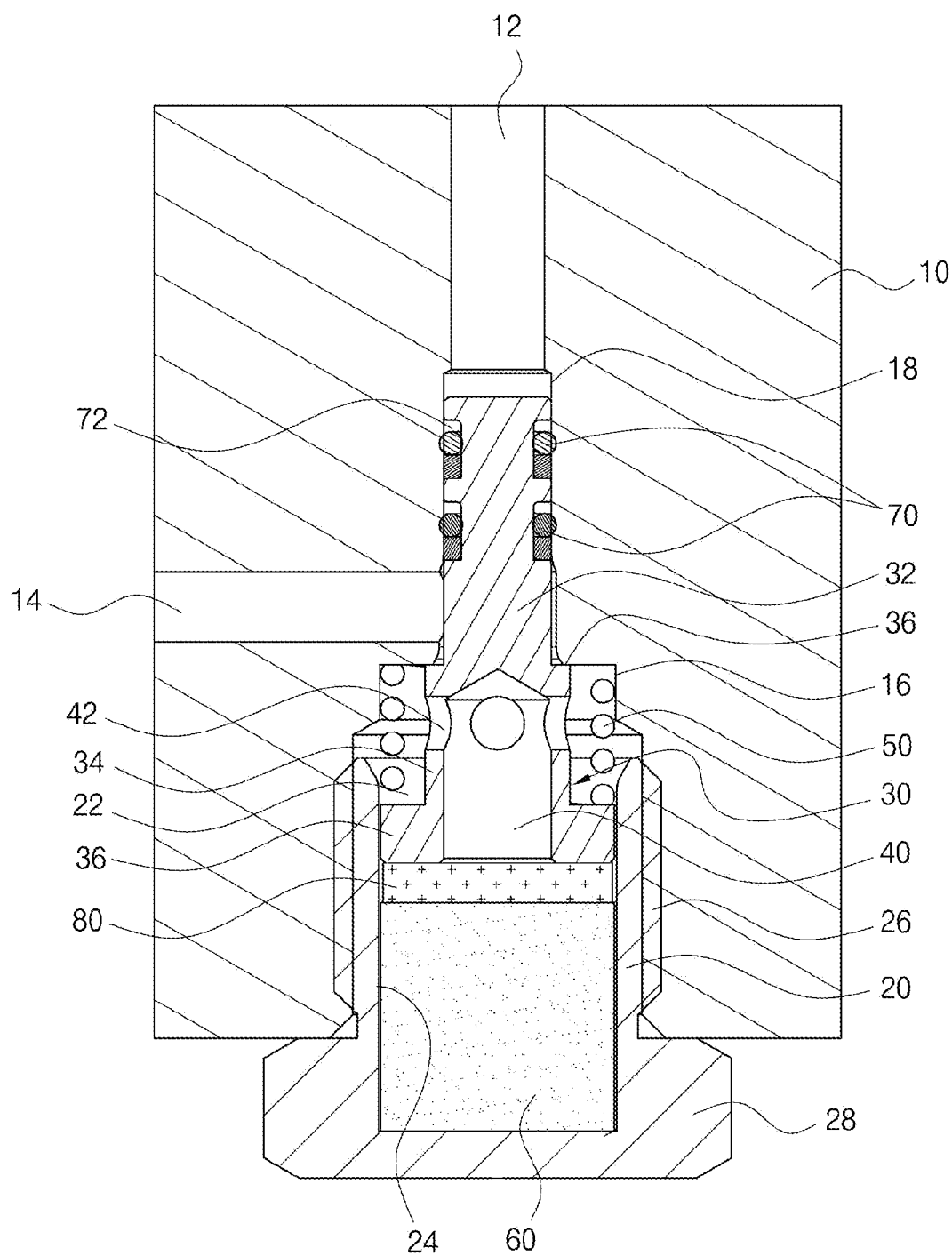
FIG. 1 is a cross-sectional view of a pressure relief device according to an embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like.

Figure 2:
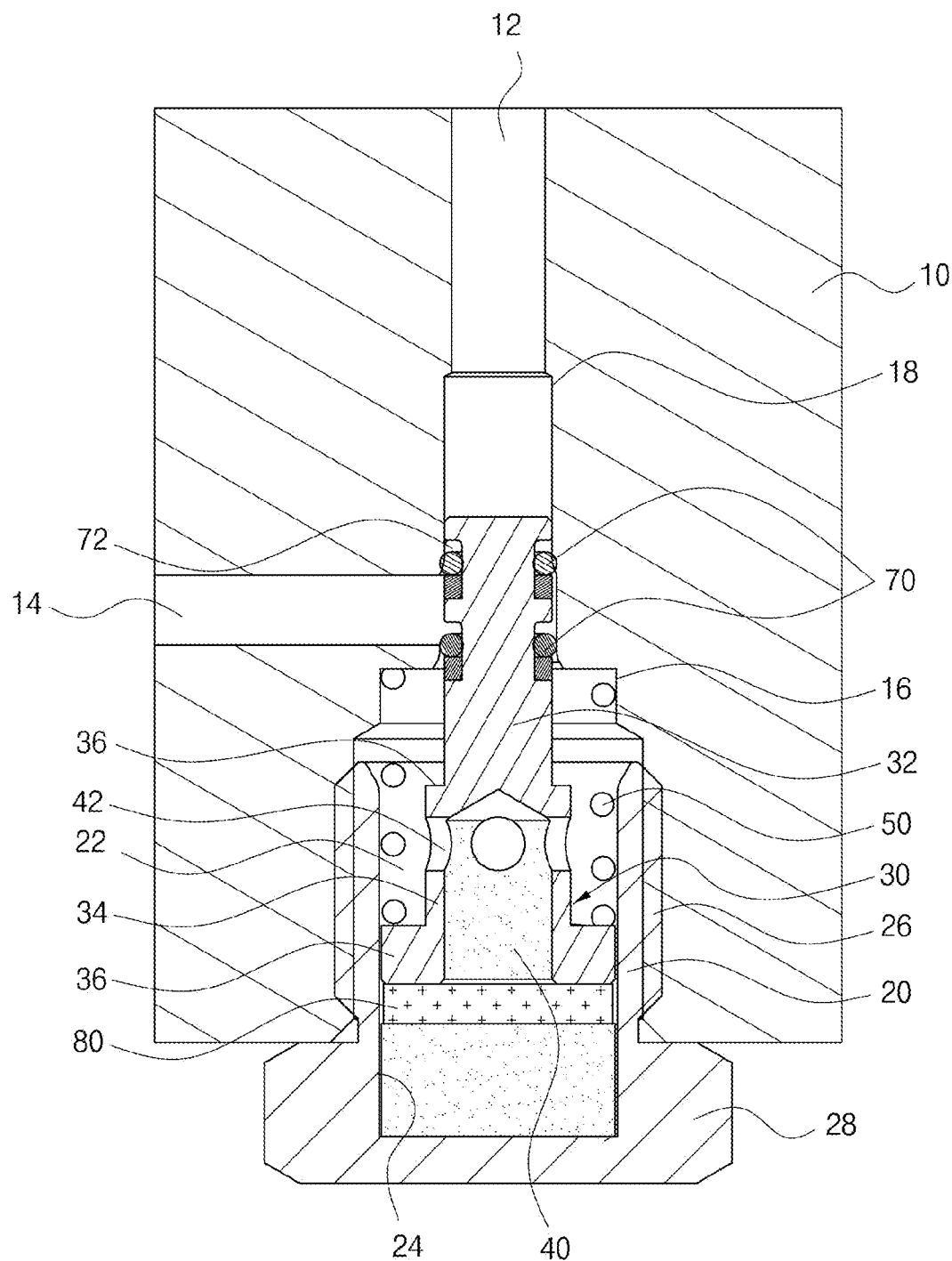
FIGS. 2 and 3 are cross-sectional views illustrating operational states of a pressure relief device according to an embodiment of the present invention.
Figure 3:
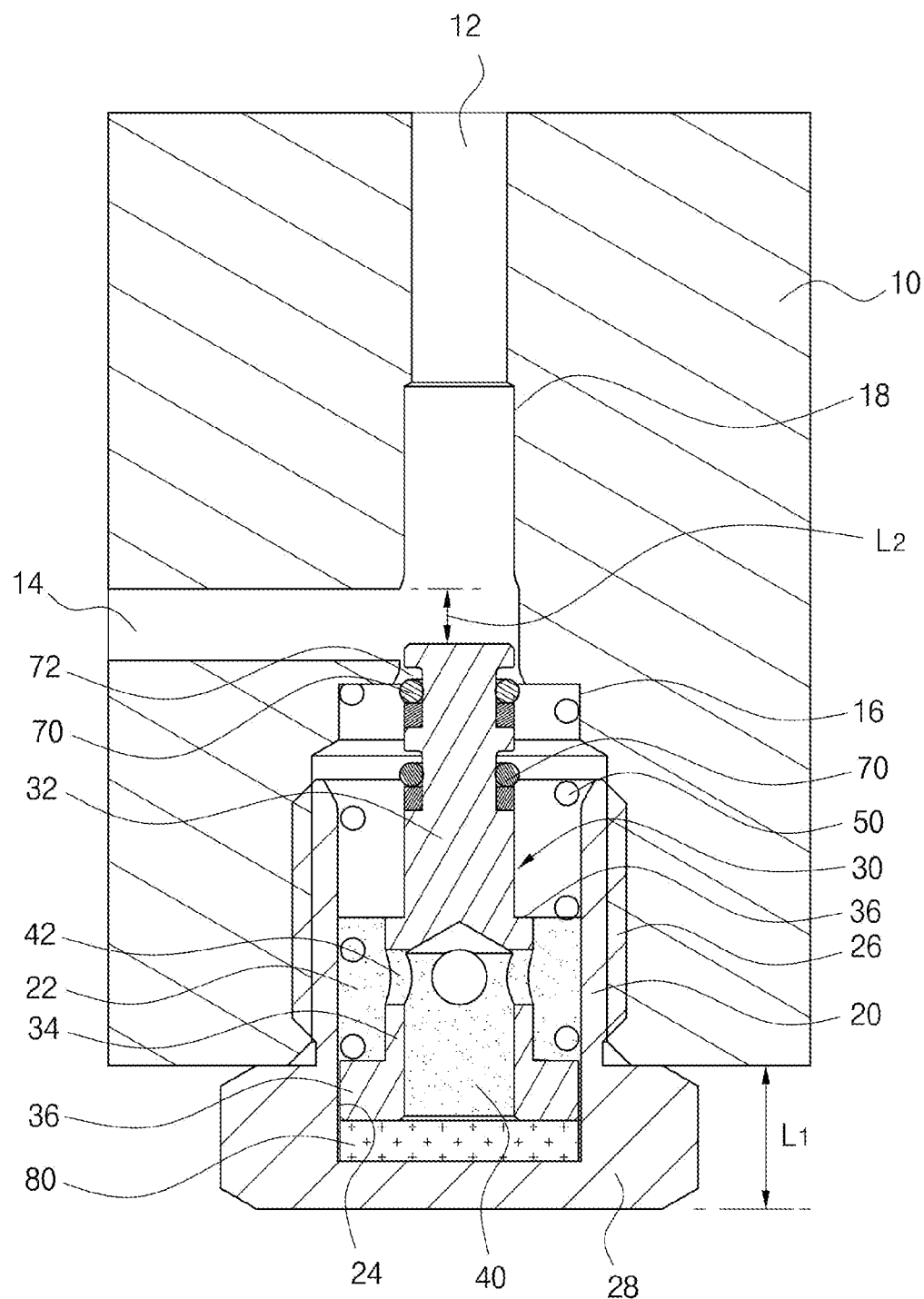

FIG. 1 is a cross-sectional view of a pressure relief device according to an embodiment of the present invention, and FIGS. 2 and 3 are cross-sectional views illustrating operational states of a pressure relief device according to an embodiment of the present invention.

A valve assembly for a high-pressure vessel includes: a valve body 10 mounted at an entrance of a gas-filled high-pressure vessel, and having a plurality of valves formed therein; a manual valve installed on the valve body 10 to manually open and close a flow path; a solenoid valve installed on the valve body 10 to automatically open and close the flow path according to an electrical signal; and a pressure relief device installed on the valve body to release gas in the high-pressure vessel to prevent the high-pressure vessel from exploding when an ambient temperature rises at the outbreak of fire caused by a vehicle accident.

Such a valve assembly for a high-pressure vessel according to the present embodiment is installed in a hydrogen fuel cell vehicle and is mainly used for controlling the flow of a hydrogen raw material and can be applied to any system for charging and supplying a high-pressure gas in addition to the hydrogen fuel cell vehicle.

The valve body 10 includes: an inlet passage 12 communicating with a high-pressure vessel and introducing gas into the high-pressure vessel; a discharge passage 14 communicating at a right angle with the inlet passage 12 and discharging gas to the outside; and a mounting part 16 located between the inlet passage 12 and the discharge passage 14 and equipped with a pressure release device sealably.

The pressure relief device includes: a piston member 30 placed in the mounting part 16 to be linearly movable and having an opened lower side to form a first chamber part 40, which is hermetically inserted into the inlet passage 12 to seal the inlet passage 12; a cap member 20 that is hermetically coupled to the mounting part 16 and has an inner space part divided by the piston member 30 to form an upper-side second chamber part 22 and a lower-side third chamber part 24; a spring 50 installed between an inner surface of the mounting part 16 and the piston member 30 to provide an elastic force to the piston member 30 in a direction in which the piston member 30 retreats; and a fusible alloy 60 which is mounted on the third chamber part 24 of the piston member 30 to support the piston member 30 not to retract, and which is molten when a surrounding temperature is higher than or equal to a set temperature to retract the piston member 30 to open the inlet passage 12.

The piston member 30 includes: a sealing rod part 32 inserted into the inlet passage 12 to seal the inlet passage 12; a chamber forming part 34 forming a first chamber part 40, which has an outer diameter greater than that of the sealing rod part 32 below the sealing rod part 32 and has an open lower side thereof; and a slide part 36 that extends outward from a lower side of the chamber forming part 34 to be in contact with an inner surface of the cap member 20 to slidably move and divide the inner space part of the cap member 20 into the second chamber part 22 and the third chamber part 24.

An insertion part 18 into which the sealing rod part 32 is inserted is formed below the inlet passage 12 to have an inner diameter larger than an inner diameter of the inlet passage 12, a plurality of grooves 72 are formed on an outer surface of the sealing rod part 32, and a plurality of sealing rings 70 are mounted on the grooves 72 to closely adhere to the inner surface of the insertion part 18 to perform sealing.

The chamber forming part 34 has a larger outer diameter than the sealing rod part 32, and a stepped part 38 is formed at a top end thereof, and the stepped part 38 is caught on a top surface of the mounting part 16 to limit the piston member 30 from moving upward. In addition, the chamber forming part 34 includes a connection passage part 42 formed to communicate between the first chamber part 40 and the second chamber part 22.

The cap member 20 has a screw part 26 formed on its outer surface to be screw-coupled to an inner surface of the mounting part 16, and space parts 22 and 24 with an open upper side are formed inside. The space parts 22 and 24 are divided into a second chamber part 22 and a third chamber part 24 by the slide part 36 of the piston member 30, and a fusible alloy 60 is mounted on the third chamber part 24.

As illustrated in FIG. 3, a space securing part 28 protruding by a length L1 from an outer surface of the valve body 10 is formed under the cap member 20, and the sizes of the space parts 22 and 24 of the cap member 20 are determined according to a length of the space securing part 28. Therefore, the moving distance of the piston member 30 is determined according to the length of the space securing part 28, and an opening size L2 of the inlet passage 12 is determined according to the moving distance of the piston member 20. Accordingly, the discharge flow rate of the gas is determined.

In other words, if the length L1 of the space securing part 28 is long, the opening size L2 of the inlet passage increases, and the discharge flow rate of the gas increases, and if the length L1 of the space securing part 28 is short, the opening size L2 of the inlet passage decreases, and the discharge flow rate of the gas decreases. Accordingly, the discharge flow rate of the gas may be adjusted by simply adjusting the length of the space securing part 28 during designing.

A porous screen 80 is mounted between the fusible alloy 60 and the slide part 36 of the piston member 30 to protect the fusible alloy 60 from being deformed when the fusible alloy 60 is in a solid state. When the fusible alloy 60 is molten, the molten fusible alloy passes through the porous screen 80. The porous screen 80 may be in the form of a wire mesh and may include a metal material.

The fusible alloy 60 is an alloy in which a plurality of fusible metals are mixed in a predetermined ratio so that they can be melted at a set temperature, and the components are prepared by mixing metals such as Bi, Pb, Sn, Cd, and In in a predetermined ratio. In this case, Pb, Sn, and Cd, which are the core metals of the fusible alloy 60, are metals that correspond to heavy metal regulations and cause environmental pollution when released into the air.

Therefore, in this embodiment, to prevent the molten fusible alloy 60 from leaking out, the first chamber part 40 is formed in the piston member 30 so that the molten fusible alloy 60 is primarily introduced therein, and the second chamber part 22 is formed in the cap member 20 so that the molten fusible alloy 60 is secondly introduced therein.

The operation of the pressure relief device which is constructed as described above according to an embodiment of the present invention will be described below.

First, when the ambient temperature is below the set temperature, as shown in FIG. 1, the piston member 30 is inserted into the inlet passage 12 to close the inlet passage 12 to prevent the outflow of gas.

When the ambient temperature rises due to an accident or fire, as shown in FIG. 2, the fusible alloy 60 is molten by heat. The molten fusible alloy 60 passes through the porous screen 80 and flows into the first chamber part 40 formed in the piston member 30, and the piston member 30 is moved downward by the elastic force of the spring 50, as much as an amount by which the fusible alloy 60 is moved to the first chamber part 40.

In addition, as shown in FIG. 3, when the molten fusible alloy 60 introduced into the first chamber part 40 moves to the second chamber part 22 formed in the cap member 20 through the connection passage part 42, the first and second chamber parts 40 and 22 are filled with the molten fusible alloy 60, and the fusible alloy 60 does not remain in the third chamber part 24. Accordingly, as the piston member 30 is in a maximum descending state and the inlet passage 12 is opened, the gas introduced into the inlet passage 12 is discharged to the outside through the discharge passage 14.

As described above, the molten fusible alloy may be introduced into the first chamber part formed in the piston member and the second chamber part formed in the cap member, thereby fundamentally blocking the molten fusible alloy from flowing out.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be usefully applied to a pressure release device for high pressure vessel of a hydrogen fuel cell system.

What is claimed is:

1. A pressure relief device for a high-pressure vessel, the pressure relief device, which is mounted on a mounting part formed between an inlet passage through which gas from a valve body flows and a discharge passage through which gas is discharged to the outside to open and close the inlet passage, the pressure relief device comprising:
    a cap member mounted on the mounting part to be able to seal and having a space part formed therein;
    a piston member inserted into the cap member to be linearly movable, having a first chamber part with an open lower side, sealing the inlet passage by being inserted into the inlet passage to be sealed, and dividing the space part of the cap member into a second chamber part and a third chamber part;
    a spring installed between the piston member and an inner surface of the mounting part to provide an elastic force in a direction in which the piston member is retracted; and
    a fusible alloy which is mounted on the third chamber part so as to support the piston member so that the piston member is not retracted, and is molten to retract the piston member and to open the inlet passage when a surrounding temperature is greater than or equal to a set temperature, wherein,
    when the fusible alloy is molten, the molten fusible alloy is sequentially introduced into the first chamber part and the second chamber part to be prevented from being discharged to the outside.

2. The pressure relief device for a high-pressure vessel of claim 1, wherein the piston member comprises:
    a sealing rod part inserted into the inlet passage to seal the inlet passage;
    a chamber forming part forming the first chamber part, which has an outer diameter greater than that of the sealing rod part below the sealing rod part and has an open lower side thereof; and
    a slide part that extends outward from a lower side of the chamber forming part to be in contact with an inner surface of the cap member to slidably move and divide the space part of the cap member into the second chamber part and the third chamber part.

3. The pressure relief device for a high-pressure vessel of claim 2, wherein a connection passage part is formed in the chamber forming part to connect the first chamber part and the second chamber part to allow the molten fusible alloy introduced into the first chamber part to flow into the second chamber part.

4. The pressure relief device for a high-pressure vessel of claim 1, wherein a porous screen is provided between a slide part of the piston member and the fusible alloy, and the porous screen is introduced into the first chamber part through the porous screen when the fusible alloy is molten.

5. The pressure relief device for a high-pressure vessel of claim 2, wherein a plurality of grooves are formed on an outer surface of the sealing rod part, and a plurality of sealing rings are mounted in the plurality of grooves.

6. The pressure relief device for a high-pressure vessel of claim 1, wherein the cap member has a screw part formed on an outer surface thereof so as to be screw-coupled to an inner surface of the mounting part, a space part having an open upper side formed on an inner surface thereof such that the piston member and the fusible alloy are inserted therein, and a space securing part having a lower side thereof protruding from an outer surface of the valve body by a length (L1) so as to determine the size of the space part.

7. The hub-type electronic driving device of claim 5, wherein the discharge flow rate of the gas is determined according to the length (L1) of the protrusion of the cap member.

* * * * *